United States Patent
Kon et al.

(10) Patent No.: US 11,556,811 B2
(45) Date of Patent: *Jan. 17, 2023

(54) INFORMATION PROCESSING APPARATUS AND STORAGE MEDIUM

(71) Applicant: SONY CORPORATION, Tokyo (JP)

(72) Inventors: Takayasu Kon, Tokyo (JP); Yoichiro Sako, Tokyo (JP); Kazunori Hayashi, Tokyo (JP); Yasunori Kamada, Kanagawa (JP); Takatoshi Nakamura, Tokyo (JP); Hiroyuki Hanaya, Kanagawa (JP); Tomoya Onuma, Shizuoka (JP); Akira Tange, Tokyo (JP)

(73) Assignee: SONY CORPORATION, Tokyo (JP)

(*) Notice: Subject to any disclaimer, the term of this patent is extended or adjusted under 35 U.S.C. 154(b) by 611 days.

This patent is subject to a terminal disclaimer.

(21) Appl. No.: 16/512,596

(22) Filed: Jul. 16, 2019

(65) Prior Publication Data
US 2019/0340523 A1    Nov. 7, 2019

Related U.S. Application Data

(63) Continuation of application No. 14/248,763, filed on Apr. 9, 2014, now Pat. No. 10,387,782.

(30) Foreign Application Priority Data

May 23, 2013 (JP) ................................ 2013-108798

(51) Int. Cl.
*G06N 5/04* (2006.01)

(52) U.S. Cl.
CPC ...................................... *G06N 5/04* (2013.01)

(58) Field of Classification Search
None
See application file for complete search history.

(56) References Cited

U.S. PATENT DOCUMENTS 8,041,801 B2   10/2011   Nakamura et al.
8,612,030 B2   12/2013   Sakai et al.
(Continued)

FOREIGN PATENT DOCUMENTS

JP   H11-009752 A    1/1999
JP   2002-117130 A   4/2002
(Continued)

OTHER PUBLICATIONS

Treichler, Testing Musical Ability: An American Dissenter and Some Related Historical Comparisons, History of the Human Sciences, 26(5), Dec. 2013, pp. 48-68 (Year: 2013).*

(Continued)

*Primary Examiner* — Wilbert L Starks
(74) *Attorney, Agent, or Firm* — Paratus Law Group, PLLC

(57) ABSTRACT

Provided is an information processing apparatus, including a calculation section which calculates a proficiency level of a user for operations performed by the user for achieving a prescribed objective based on history information related to the operations and attribute information related to physical features of the user, and a generation section which generates advice for achieving the objective based on the proficiency level calculated by the calculation section.

20 Claims, 10 Drawing Sheets

(56) References Cited

U.S. PATENT DOCUMENTS

| | | | |
|---|---|---|---|
| 10,228,895 | B2 | 3/2019 | Miyajima et al. |
| 2001/0032539 | A1 | 10/2001 | Chantzis et al. |
| 2002/0024444 | A1 | 2/2002 | Hiyama et al. |
| 2004/0036601 | A1 | 2/2004 | Obradovich |
| 2006/0107826 | A1 | 5/2006 | Knapp et al. |
| 2008/0051919 | A1 | 2/2008 | Sakai et al. |
| 2008/0176655 | A1 | 7/2008 | James et al. |
| 2009/0271496 | A1 | 10/2009 | Nakamura et al. |
| 2009/0298028 | A1 | 12/2009 | Saunders |
| 2010/0137049 | A1 | 6/2010 | Epstein |
| 2012/0047077 | A1* | 2/2012 | Humphrey ........... G06Q 10/101 705/300 |
| 2014/0351191 | A1 | 11/2014 | Kon et al. |
| 2015/0379892 | A1 | 12/2015 | Sako et al. |
| 2016/0005329 | A1 | 1/2016 | Sako et al. |

FOREIGN PATENT DOCUMENTS

| | | | |
|---|---|---|---|
| JP | 2003-099897 A | 4/2003 |
| JP | 2003-241634 A | 8/2003 |
| JP | 2004-509018 A | 3/2004 |
| JP | 2004-171060 A | 6/2004 |
| JP | 2005-148941 A | 6/2005 |
| JP | 2005-198071 A | 7/2005 |
| JP | 2006-195021 A | 7/2006 |
| JP | 2006-209148 A | 8/2006 |
| JP | 2006-350567 A | 12/2006 |
| JP | 2007-203913 A | 8/2007 |
| JP | 2007-271961 A | 10/2007 |
| JP | 2008-129603 A | 6/2008 |
| JP | 2009-048044 A | 3/2009 |
| JP | 2009-048307 A | 3/2009 |
| JP | 2009-064254 A | 3/2009 |
| JP | 2009-134496 A | 6/2009 |
| JP | 2009-157063 A | 7/2009 |
| JP | 2009-222746 A | 10/2009 |
| JP | 2010-003126 A | 1/2010 |
| JP | 2010-097480 A | 4/2010 |
| JP | 2010-231776 A | 10/2010 |
| JP | 2011-024067 A | 2/2011 |
| JP | 2011-107978 A | 6/2011 |
| JP | 2011-123411 A | 6/2011 |
| JP | 2011-186995 A | 9/2011 |
| JP | 2011-210084 A | 10/2011 |
| JP | 2012-128344 A | 7/2012 |
| JP | 2012-189624 A | 10/2012 |
| JP | 2012-194060 A | 10/2012 |
| JP | 2013-003887 A | 1/2013 |
| JP | 2013-069251 A | 4/2013 |
| JP | 2013-083845 A | 5/2013 |

OTHER PUBLICATIONS

Soleh Ayubi, et al., "PersonA: Persuasive Social Network for Physical Activity", Annual International Conference of the IEEE Engineering in Medicine and Biology Society, 2012, pp. 2153-2157, Doi: 10.1109/EMBC.2012.6346387 IEEE Conference Publications.

Jiaxin Zhu, et al., "Multi-extract and Multi-level Dataset of Mozilla Issue Tracking History", IEEE/ACM 13th Working Conference on Mining Software Repositories (MSR), 2016, pp. 472-475, DOI: 10.1109/MSR.2016.057 IEEE Conference Publications.

Kebo Mei, et al., "Method of Recommend Microblogging Based on User Model", IEEE 12th International Conference on Computerand Information Technology, 2012, pp. 1056-1060, DOI: 10.1109/CIT.2012.216 IEEE Conference Publications.

Xiao Chen, et al., "A Cloud-Based Trust Management Framework for Vehicular Social Networks", IEEE Access, 2017, vol. 5, pp. 2967-2980, DOI: 10.1109/ACCESS.2017.2670024 IEEE Journals & Magazines.

Nov. 10, 2017, Chinese Office Action issued for related CN application No. 201410208592.6.

Aug. 21, 2018, Japanese Office Action issued for related JP Application No. 2017-160911.

Mar. 19, 2019, Japanese Office Action issued for related JP Application No. 2017-160911.

Jul. 2, 2019, Japanese Decision to Dismiss an Amendment issued for related JP Application No. 2017-160911.

Jul. 2, 2019, Japanese Office Action issued for related JP Application No. 2017-160911.

* cited by examiner

INFORMATION PROCESSING APPARATUS AND STORAGE MEDIUM

CROSS REFERENCE TO PRIOR APPLICATION

This application is a continuation of U.S. patent application Ser. No. 14/248,763 (filed on Apr. 9, 2014), which claims priority to Japanese Patent Application No. 2013-108798 (filed on May 23, 2013), the entire contents of which are incorporated herein by reference.

BACKGROUND

The present disclosure relates to an information processing apparatus and a storage medium.

In recent years, various instruction books and manuals related to sports have been in circulation, in response to a heightened awareness of health issues. However, since there are a wide variety of troubles or questions, it is difficult to find appropriate advice from instruction books or the like, and it is also difficult to judge whether the advice which has been found is appropriate for oneself. Also, in the case where appropriate advice is not able to be found, there will be cases where improving technique and maintaining motivation will become difficult. In such a background, technology has been developed for giving appropriate advice related to sports.

For example, technology is disclosed in JP H11-9752A which provides answers for troubles or questions related to a specific sport, or cautionary points in accordance with the current geographical features or condition, while playing the sport.

Further, technology is disclosed in JP 2003-241634A and JP 2006-209148A which classifies people who receive a provision of information related to a sport into a coach, a person aspiring to be a coach, or a player, and provides information suitable for each classification.

On the other hand, technology is disclosed in JP 2011-24067A, in the field of photography, which provides advice so as to be able to capture images with a better appearance, based on a feature amount such as brightness or edges of images captured by a user.

In addition, technology is disclosed in JP 2012-189624A which provides information of similar rivals, in accordance with a proficiency level, learning objective or learning style of a user, by setting an improvement of learning efficiency due to competition with the rivals as an objective.

SUMMARY

In the field of sports, suitable advice will differ according to features of a user, such as physical features such as physique or muscular strength, or a technique level, even if learning the same technique. However, JP H11-9752A, JP 2003-241634A, JP 2006-209148A, JP 2011-24067A and JP 2012-189624A do not consider presenting advice in accordance with such features of a user, even if being able to present general advice.

Accordingly, the present disclosure proposes a new and improved information processing apparatus and storage medium capable of presenting suitable advice in accordance with features of a user.

According to an embodiment of the present disclosure, there is provided an information processing apparatus, including a calculation section which calculates a proficiency level of a user for operations performed by the user for achieving a prescribed objective based on history information related to the operations and attribute information related to physical features of the user, and a generation section which generates advice for achieving the objective based on the proficiency level calculated by the calculation section.

According to an embodiment of the present disclosure, there is provided a non-transitory computer-readable storage medium having a program stored therein, the program causing a computer to perform calculating a proficiency level of a user for operations performed by the user for achieving a prescribed objective based on history information related to the operations and attribute information related to physical features of the user, and generating advice for achieving the objective based on the calculated proficiency level.

According to the present disclosure such as described above, it is possible to present suitable advice in accordance with features of a user.

DETAILED DESCRIPTION OF THE EMBODIMENT(S)

Figure 1:
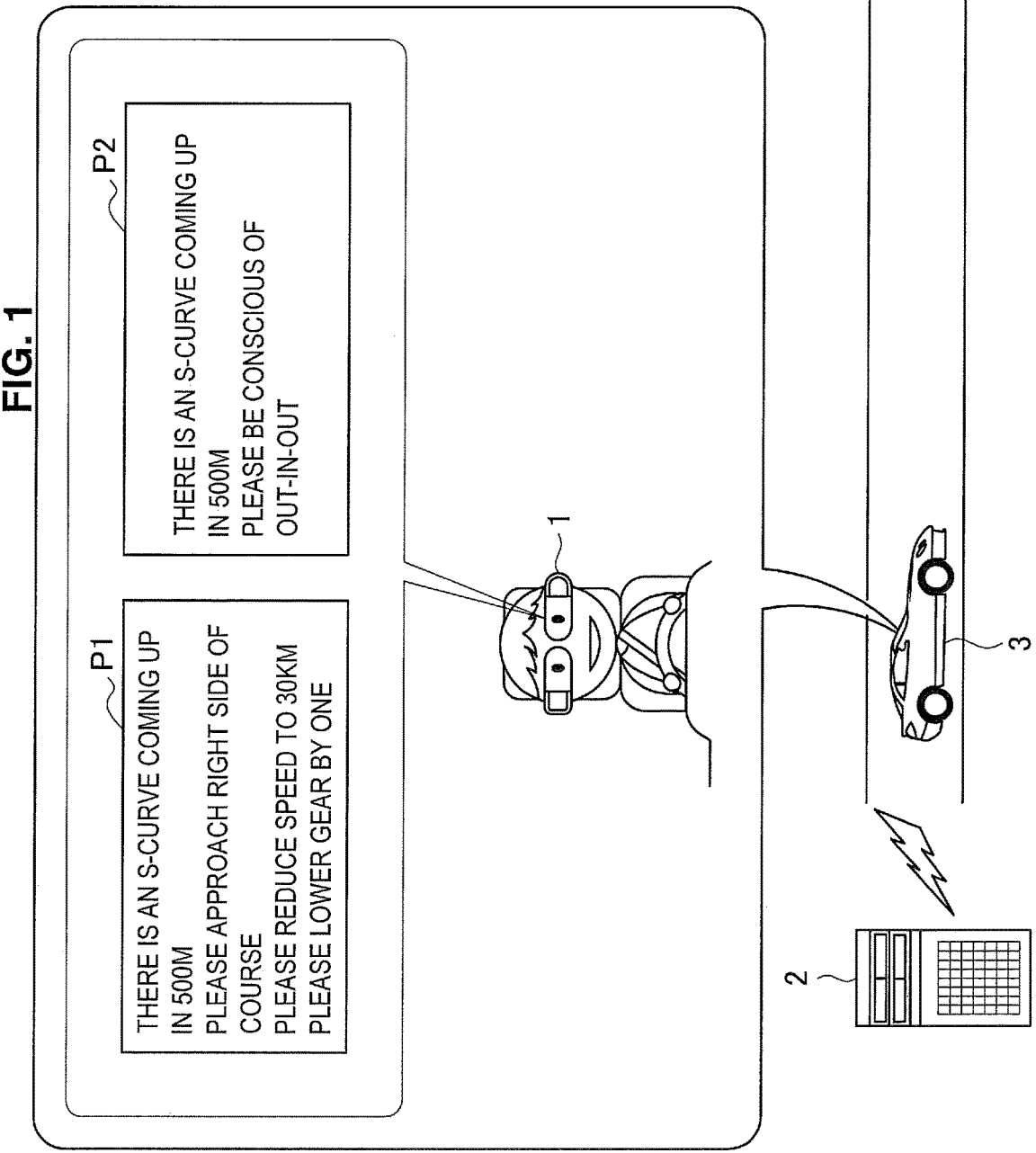
FIG. 1 is an explanatory diagram which shows an outline of an advice process according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Outline of the advice presentation process according to an embodiment of the present disclosure
2. The embodiments
2-1. The first embodiment
2-1-1. Basic configuration of the HMD
2-1-2. Basic configuration of the server
2-1-3. Operation process 2-2. The second embodiment
2-2-1. Outline
2-2-2. Operation process
2-3. The third embodiment
2-3-1. Outline
2-3-2. Operation process
3. Conclusion

1. Outline of the Advice Presentation Process According to an Embodiment of the Present Disclosure First, an outline of an advice presentation process according to an embodiment of the present disclosure will be described by referring to FIG. 1.

FIG. 1 is an explanatory diagram which shows an outline of an advice process according to an embodiment of the present disclosure. As shown in FIG. 1, a user is wearing a glasses type HMD (Head Mounted Display) 1 and is driving a car 3 in a circuit course. An advice presentation system according to an embodiment of the present disclosure is constituted from the HMD 1 and a server 2, and presents advice suitable for the user who is wearing the HMD 1.

The server 2 stores history information related to motor sports which the user has left in the past. For example, result information such as the traveling time or position in various circuit courses, and action information such as the speed or traveling line when rushing a curve, the braking timing or the steering timing, can be included as history information. Further, the server 2 also stores attribute information related to physical features such as the age, gender or body shape of the user.

The server 2 calculates a proficiency level of the user based on the history information and the attribute information of this user, and generates advice in accordance with the proficiency level. Also, the server 2 transmits the generated advice to the HMD 1 via a network, and the HMD 1 presents the user with the advice.

Here, as described above, JP H11-9752A, JP 2003-241634A, JP 2006-209148A, JP 2011-24067A and JP 2012-189624A do not consider presenting advice in accordance with features of a user, even if being able to present general advice. For this point, since the technology disclosed in JP 2011-24067A gives advice for realizing a high score by scoring brightness, edges or the like of captured images, it is thought that advice is given in accordance with a feature of a user which is the technique level. However, since the advice in JP 2011-24067A is based on only one captured image, it is difficult to say that it is based on a habit of a user not understood when not continuously observed, or a technique level of a user appearing in the processes up to pushing the shutter button.

Further, in the field of sports, since there are different suitabilities of operations according to physical features such as physique, muscular strength or the movable range of joints, suitable advice will differ in accordance with physical features. However, none of JP H11-9752A, JP 2003-241634A, JP 2006-209148A, JP 2011-24067A and JP 2012-189624A considers giving advice in accordance with physical features of a user.

In such a background, if advice can be presented in accordance with features of a user such as a technique level or physical features, an improvement in technique and an improvement in motivation can be realized for the user.

Accordingly, the point of view of this situation led to creating the server 2 (information processing apparatus) according to each of the embodiments of the present disclosure. The server 2 according to each of the embodiments of the present disclosure can present suitable advice in accordance with features of a user.

To continue, a process will be described in which the server 2 according to an embodiment of the present disclosure generates advice in accordance with a technique level (proficiency level).

Generally, in order to travel with good timing, it is important to take a good traveling line. Accordingly, in FIG. 1, the server 2 generates advice for a user who is traveling a circuit, which recommends that a traveling line 4 showing an ideal traveling line be traveled. Note that, the traveling line 4 is a traveling line capable of minimizing deceleration, by making a curve of the traveling line gentler by fully using the width of the course, which is generally called out-in-out. In order to actually travel the traveling line 4, it may be necessary to have sufficient deceleration when rushing into a corner, and have the car body approach a reverse direction to a turning direction in advance.

Here, appropriate advice will differ according to the proficiency level, even for achieving a same objective such as traveling the traveling line 4. For example, specific and detailed advice is appropriate for a beginner. This is because a beginner is not able to understand expressions such as out-in-out, for example, or is not able to understand how to implement expressions such as out-in-out even if being able to understand the expression.

In the example shown in FIG. 1, in the case where the user is a beginner, the server 2 generates an image P1 which shows specific and detailed advice, and presents the image to the user by the HMD 1. An S-curve coming up in 500 m (meters) is shown in the image P1, and specific advice is presented, such as to approach the right side of the course, to reduce speed to 30 km (kilometers), and to lower the gear by one.

On the other hand, abstract advice is appropriate for an experienced person. This is because an experienced person can execute one abstract piece of advice by instantly solving and understanding a plurality of pieces of specific advice. For example, it is possible for an experienced person to instantly understand and execute having the car body approach a reverse side to the turning direction in advance with sufficient deceleration, by only presenting expressions such as out-in-out, for example. Accordingly, abstract advice with which a lot of information can be obtained with few expressions is more appropriate for an experienced person.

In the example shown in FIG. 1, in the case where the user is an experienced person, the server 2 generates an image P2 which shows abstract advice, and presents the image to the user by the HMD 1. An S-curve coming up in 500 m (meters) is shown in the image P2, and abstract advice is presented, such as to be conscious of out-in-out.

Heretofore, a process has been described in which the server 2 generates advice in accordance with a proficiency level. Alternatively, the server 2 can generate advice in accordance with physical features of a user, such as described above. For example, the server 2 gives effective advice for a user to output a better result, in accordance with the physique, muscular strength or moveable range of joints of the user. Further, the server 2 can generate suitable advice, in accordance with a condition of competition which changes from moment to moment, such as a decrease in strength or concentration due to fatigue, changes in the condition of the road, or the lightening of the car weight due to the consumption of fuel. In this way, the advice presentation system according to an embodiment of the present disclosure gives appropriate advice at a suitable time while continuously observing the past and present state of the user, in other words, implements a function as an exclusive trainer.

Note that, while an example has been described above which gives advice to a user who performs motor sports as an example, the present disclosure is not limited to such an example. For example, the server 2 can generate advice for achieving an objective, such as advancement, developing one's merits or overcoming weaknesses, for various types of operations such as other sports such as golf or tennis, cooking, manufacturing operations, musical performances, calligraphy or games.

Heretofore, an outline of the advice presentation process according to an embodiment of the present disclosure has been described. To continue, a basic configuration and operation process of an advice presentation system, which performs the advice presentation process according to each of the embodiments, will be described by referring to FIG. 2 to FIG. 10.

2. The Embodiments

2-1. The First Embodiment

First, a basic configuration of an advice presentation system common to each of the embodiments will be described by referring to FIG. 2 and FIG. 3.

[2-1-1. Basic Configuration of the HMD 1]

Figure 2:
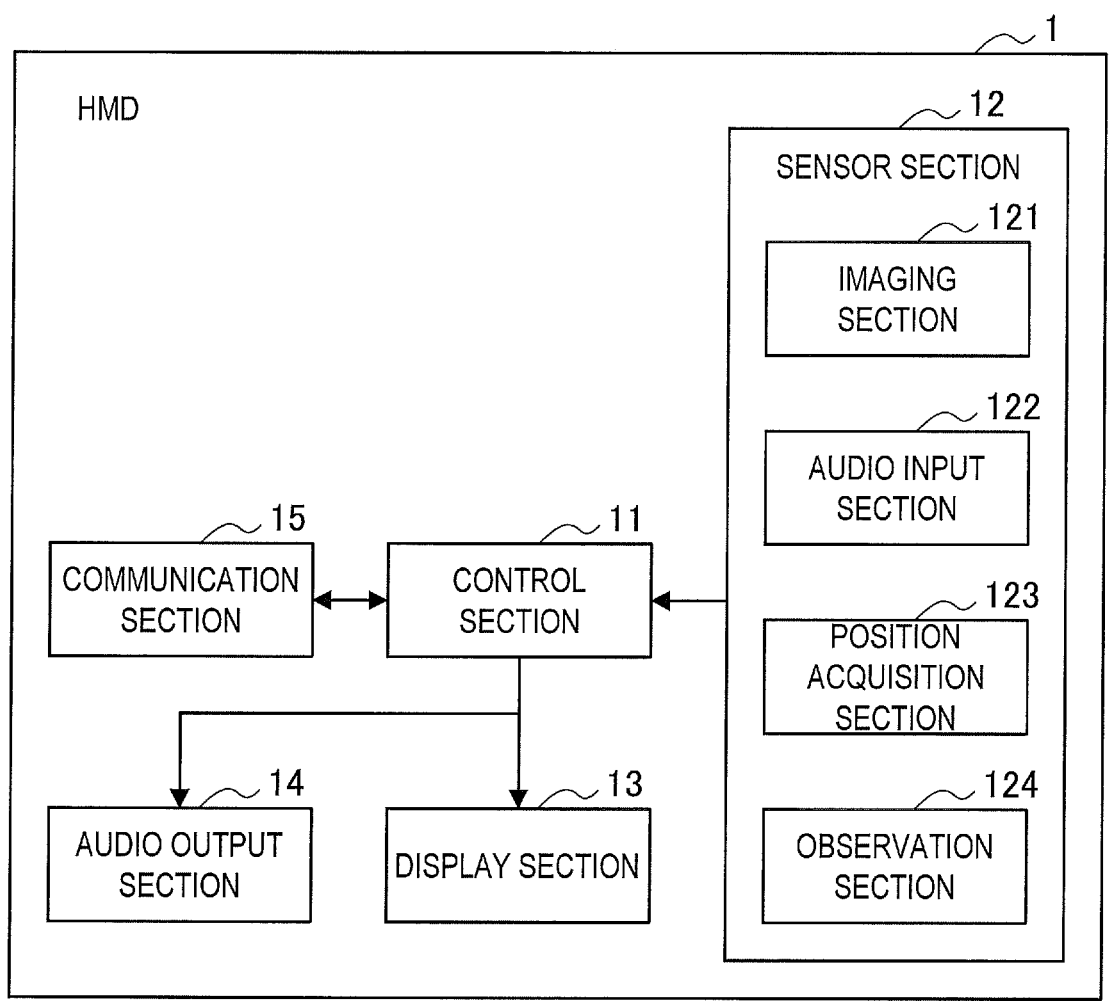
FIG. 2 is a block diagram which shows a configuration of an HMD according to an embodiment of the present disclosure.

FIG. 2 is a block diagram which shows a configuration of the HMD 1 according to an embodiment of the present disclosure. As shown in FIG. 2, the HMD 1 has a control section 11, a sensor section 12, a display section 13, an audio output section 14, and a communication section 15.

(Control Section 11)

The control section 11 functions as a calculation processing apparatus and a control apparatus, and controls all the operations within the HMD 1 in accordance with various programs. For example, the control section 11 is implemented by a CPU (Central Processing Unit) or a microprocessor. Note that, the control section 11 may include a ROM (Read Only Memory) which stores programs to be used, calculation parameters or the like, and a RAM (Random Access Memory) which temporarily stores arbitrarily changing parameters or the like.

The control section 11 according to the present embodiment acquires information for advice generation by controlling the sensor section 12, which will be described later, and outputs the acquired information to the communication section 15. Further, the control section 11 is allowed to output advice generated by the server 2 to the display section 13 and the audio output section 14, based on information received from the server 2 by the communication section 15.

(Sensor Section 12)

The sensor section 12 has a function which acquires information related to the operations and state of the user wearing the HMD 1, and the surrounding environment, as information used for advice generation in the server 2. The sensor section 12 functions as an imaging section 121, an audio input section 122, a position acquisition section 123 and an observation section 124.

*Imaging Section 121

The imaging section 121 has a lens system constituted by an imaging lens, an aperture, a zoom lens, a focus lens or the like, a driving system which allows a focus operation and zoom operation to be performed for the lens system, and a solid state imaging sensor array which generates imaging signals by photoelectrically converting captured light obtained by the lens system. For example, the solid state imaging sensor array may be implemented by a CCD (Charge Coupled Device) sensor array, or a CMOS (Complementary Metal Oxide Semiconductor) sensor array.

The imaging section 121 according to the present embodiment has a function which captures, in real time, the surroundings of the user who is wearing the HMD 1. For example, in a state in which the HMD 1 is worn by the user, the imaging lens is arranged facing the front, so as to capture the direction which the user visually recognizes as a photographic subject direction. Further, in a state in which the HMD 1 is worn by the user, an additional imaging lens is arranged facing within the HMD 1, so as to capture the face or body of the user as a photographic subject direction.

By including the imaging section 121, the HMD 1 according to the present embodiment can acquire, in real time, images which suggest the condition of the surroundings of the user, and the operations and state of the user. Further, for example, by including the imaging section 121, the HMD 1 can allow gesture inputs by the user. The imaging section 121 outputs captured images of the direction visually recognized by the user, and captured images which capture the user, to the control section 11.

*Audio Input Section 122

The audio input section 122 has a function which collects, in real time, sounds of the user who is wearing the HMD 1, or sounds of the surroundings. For example, the audio input section 122 is implemented by a microphone. The audio input section 122 may have a microphone amplifier section or an A/D convertor which amplifies and processes audio signals obtained by the microphone, and a signal processing circuit which performs processes such as noise removal and sound source separation for the audio data.

By including the audio input section 122, the HMD 1 according to the present embodiment can acquire sounds which suggest the condition of the surroundings of the user and the operations and state of the user. Further, for example, by including the audio input section 122, the HMD 1 can allow audio input by the user. The audio input section 122 outputs the collected audio data to the control section 11.

*Position Acquisition Section 123

The position acquisition section 123 has a function which acquires, in real time, the position of the HMD 1. For example, the position acquisition section 123 is implemented by a GPS (Global Positioning System), and detects the position at which the HMD 1 is present, by receiving radio waves from a GPS satellite, and outputs the detected position information. Note that, the position acquisition section 123 is an example of a position information acquisition section which detects the position of the HMD 1 based on acquisition signals from the outside, and an example of a position information acquisition section according to the present embodiment is not limited to this. For example, the position information acquisition section may detect the position by WiFi, transmission/reception with a mobile phone, PHS, smartphone or the like, or near field communication.

The position acquisition section 123 outputs position information which shows the acquired position to the control section 11.

*Observation Section 124

The observation section 124 has a function which observes, in real time, a state of the user who is wearing the HMD 1. For example, the observation section 124 observes a state of the user, such as vital signals such as body temperature, pulse, blood pressure or respiration, perspiration, blinking, myoelectricity and brain waves. The observation section 124 observes a state of the user by sensing results with sensors which come into contact with the body surface of the user, or non-contact sensors by sound waves or the like.

The observation section 124 outputs observation information which shows an observation result to the control section 11.

*Supplementation

The sensor section 12 can acquire various types of information other than that described above. For example, the sensor section 12 includes an acceleration sensor and a gyro sensor, and may acquire information which shows the direction or angle which the user is facing. Further, the sensor section 12 may acquire weather information such as temperature, sensory temperature, dew point temperature, wet bulb temperature, wind speed, maximum wind speed, average wind speed, wind orientation, humidity, relative humidity, pressure and light amount. Alternatively, the sensor section 12 may acquire information which shows pollen, air pollution, odorous substances, radiation or the like.

(Display Section 13)

The display section 13 has a function which displays image data, in accordance with a control by the control section 11. Specifically, the display section 13 presents advice generated by the server 2, by image output, for the user who is wearing the HMD 1. For example, the display section 13 is implemented by an LCD (Liquid Crystal Display) or an OLED (Organic Light-Emitting Diode), The display section 13 is arranged, as a pair of display devices for the left eye and the right eye, directly in front of both eyes of the user, that is, in a position at which the lenses of glasses are normally positioned, in a state of wearing the HMD 1. For example, captured images of a real space captured by the imaging section 121 are displayed on the display section 13. Further, the display section 13 may be a transmission type, and by setting the display section 13 as a through state by the HMD 1, that is, as a transparent or semitransparent state, the HMD 1 will not hinder normal activities of the user even if normally worn in such glasses.

The display section 13 may have a pixel driving circuit which switches between a through state (transparent or semitransparent state) and a non-through state by controlling the transmittance of each pixel. Further, for example, the display section 13 may include a video processor, a digital signal processor, a D/A convertor or the like, and may display images by performing brightness level adjustment, color correction, contrast adjustment, sharpness (edge enhancement) adjustment or the like of the image data to be displayed.

(Audio Output Section 14)

The audio output section 14 has a function which outputs sounds for the user who is wearing the HMD 1. Specifically, the audio output section 14 presents advice generated by the server 2, by sound output, for the user who is wearing the HMD 1. For example, the audio output section 14 is implemented by earphone speakers, and is inserted into the right and left ears of the user who is wearing the HMD 1. Alternatively, the audio output section 14 may be formed as a so-called bone conduction speaker. Further, the audio output section 14 may have an amplifier circuit for amplifying audio data to be output. The audio output section 14 outputs (reproduces) audio signal data, in accordance with a control by the control section 11.

(Communication Section 15)

The communication section 15 is a communication module for performing transmission/reception of data with external instruments. For example, the communication section 15 wirelessly communicates directly with external instruments or via a network access point, by a system such as wireless LAN (Local Area Network), Wi-Fi (Wireless Fidelity®), infrared data communication or Bluetooth®.

In the present embodiment, the communication section 15 performs data communication with the server 2. More specifically, the communication section 15 transmits information acquired by the sensor section 12 to the server 2, receives advice generated by the server 2, and outputs the generated advice to the control section 11.

Heretofore, a configuration of the HMD 1 according to the present embodiment has been described. To continue, a configuration of the server 2 according to the present embodiment will be described by referring to FIG. 3.

[2-1-2. Basic Configuration of the Server 2]

Figure 3:
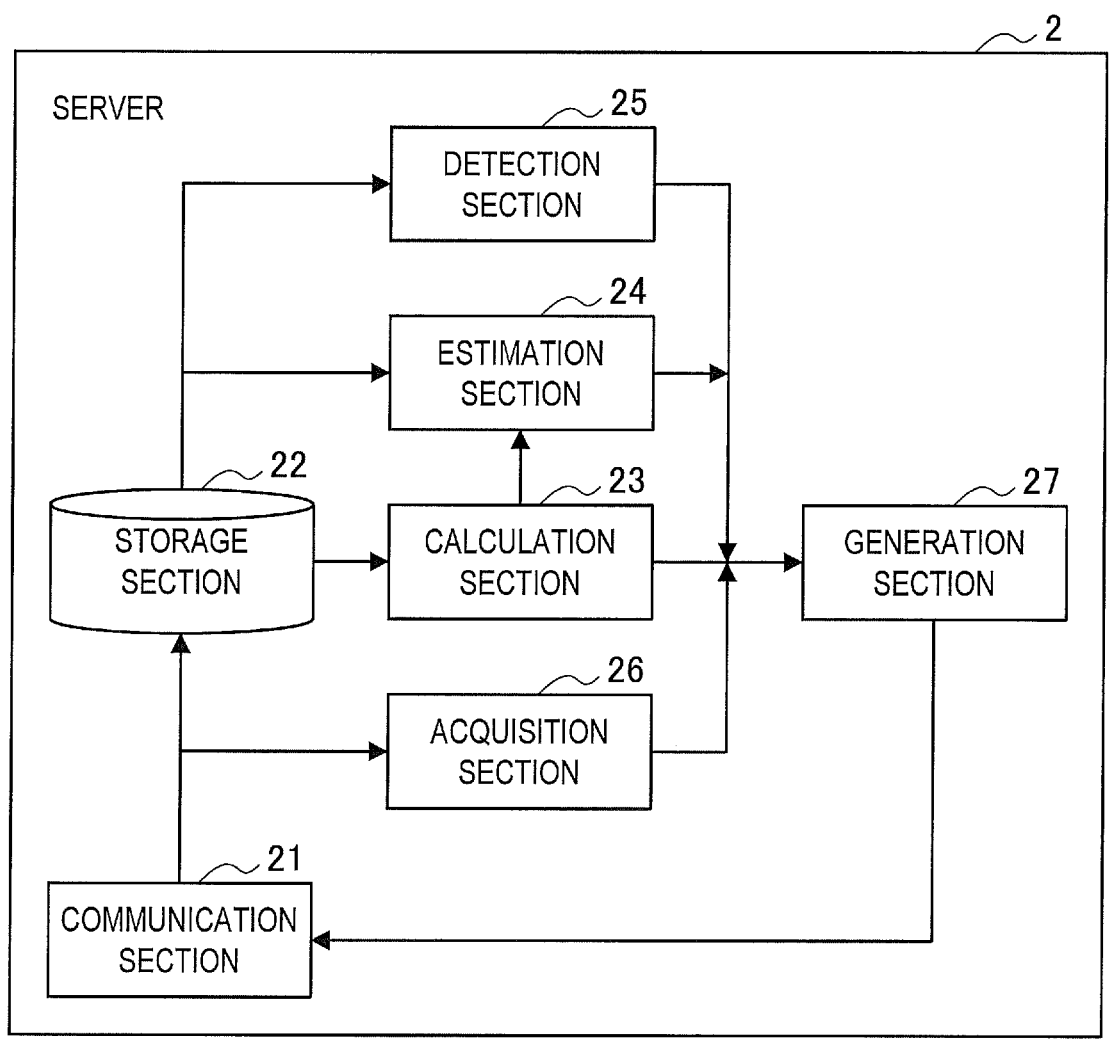
FIG. 3 is a block diagram which shows a configuration of a server according to an embodiment of the present disclosure.

FIG. 3 is a block diagram which shows a configuration of the server 2 according to an embodiment of the present disclosure. As shown in FIG. 3, the server 2 has a communication section 21, a storage section 22, a calculation section 23, an estimation section 24, a detection section 25, an acquisition section 26 and a generation section 27.

(Communication Section 21)

The communication section 21 is a communication module for performing transmission/reception of data with external instruments by wires or wirelessly. For example, the communication section 21 performs wired or wireless communication directly with external instruments or via a network access point, by a system such as a wired/wireless LAN, an exclusive line, a telephone line, Wi-Fi®, infrared data communication or Bluetooth®. In the present embodiment, the communication section 21 performs data communication with the HMD 1.

In the present embodiment, the communication section 21 receives various types of information of the user acquired by the HMD 1, and outputs the received information to the storage section 22 and the acquisition section 26. Also, the communication section 21 replies to the HMD 1 with information which shows advice generated by the generation section 27 in accordance with the received information.

Note that, the communication section 21 can also be perceived as having a function as a presentation control section, which is allowed to present the user with advice generated by the generation section 27 via the HMD 1.

(Storage Section 22)

The storage section 22 is a part which performs recording/reproduction of data for a prescribed recording medium. For example, the storage section 22 is implemented as an HDD (Hard Disc Drive). Needless to say a solid memory such as a flash memory, a memory card built into a solid memory, an optical disk, a magneto-optical disk, a hologram memory or the like can be variously considered as the recording medium, and a structure which can execute recording/reproduction in accordance with the recording medium to be adopted may be set as the storage section 22.

The storage section 22 according to the present embodiment stores history information related to operations of the user and attribute information related to physical features of the user. Here, the history information is information which includes a history of the operations performed by the user and an achievement level of the objectives of the operations. For example, in motor sports, the storage section 22 stores, as a history of operations, action information such as the speed or traveling line when rushing a curve, the braking timing or the steering timing. Further, the storage section 22 stores, as an achievement level of the objectives, result information such as the traveling time or position in various circuit courses. Further, the attribute information is profile information which includes at least one of the age, gender, body shape (height, weight), muscular strength, eyesight, hearing, dominant arm, dominant foot, dominant eye and dominant ear of the user.

The storage section 22 successively stores history information and attribute information, based on information received from the HMD 1. Alternatively, the storage section 22 may store history information and attribute information, based on a user input by a smartphone, mobile terminal or the like.

The storage section 22 outputs the stored information to the calculation section 23, the estimation section 24 and the detection section 25.

(Calculation Section 23)

The calculation section 23 has a function which calculates a proficiency level of a user for operations, based on history information related to the operations performed for the user to achieve a prescribed objective, and attribute information related to physical features of the user, which are stored in the storage section 22. Here, for example, the prescribed objective shows an objective, such as advancement, developing one's merits or overcoming weaknesses, for operations such as sports, cooking, manufacturing operations, musical performances, calligraphy or games.

Specifically, the calculation section 23 calculates a proficiency level of the user, based on a difference between operations predetermined to be ideal and the operations of the user. For example, the calculation section 23 calculates a proficiency level in accordance with a response speed of the user for advice presented by the HMD 1, and the degree to which the instruction contents can be implemented. Further, the calculation section 23 calculates a proficiency level, based on history information, such as the traveling time or position in various circuit courses, acceleration, the speed or traveling line when rushing a curve, the braking timing or the steering timing, in the above described motor sports. Alternatively, for example, the calculation section 23 calculates a proficiency level, based on flavor or serving in cooking, the manufacturing speed or arrangement in manufacturing operations, the strength or rhythm in a musical performance, a camera setting or distance arrangement in photography, or a strategy or outcome in a game. Further, in abdominal respiration, for example, the calculation section 23 may calculate a proficiency level based on the frequency of respiration.

Here, operations which are ideal will differ according to the physical features of the user. For example, operations utilizing a tall height if tall, operations utilizing muscular strength if the muscular strength is strong, and operations utilizing flexibility if the muscles are flexible, can be ideal operations. Accordingly, the calculation section 23 calculates a proficiency level additionally based on the physical features of the user. For example, in the case where the user runs 100 meters in 20 seconds in track and field sports, the calculation section 23 calculates a proficiency level which is high if the user is old, and calculates a proficiency level which is low if the user is young. This is because a record of running 100 meters in 20 seconds is a good record for an older person, and is a bad record for a younger person. Alternatively, since there are actions which are possible or not possible according to physique and the moveable range of joints of the user, operations which are ideal will differ. Accordingly, by having the calculation section 23 calculate a proficiency level based on the physical features of the user, it becomes possible for the generation section 27, which will be described later, to generate advice in accordance with the physical features of the user.

Further, the calculation section 23 may break down an operation of the user into a plurality of partial operations, and calculate a proficiency level for each of the partial operations. For example, the calculation section 23 calculates a proficiency level for each partial operation, by breaking down an operation in which a racket is swung in tennis into partial operations such as the movement of the feet, the rotation of the hips, the movement of the hands and the movement of the eyes following the ball.

The calculation section 23 outputs the calculated proficiency level to the estimation section 24 and the generation section 27.

(Estimation Section 24)

The estimation section 24 has a function which estimates other objectives capable of being easily achieved by the user (there is a potential), based on the history information and the proficiency level. Specifically, the estimation section 24 can estimate other objectives capable of being easily achieved, which commonly include operations with a high proficiency level from among the operations performed by the user. For example, the estimation section 24 estimates that there is a potential of table tennis, in which a similar swing form may be necessary, for a user who has a good swing form of tennis. Alternatively, the estimation section 24 estimates that there is a potential of coking twice cooked pork, in which similar pan flipping may be necessary, for a user which has a high pan flipping technique of fried rice.

Further, the estimation section 24 can estimate other objectives which have a potential, additionally based on the history information and the proficiency level of other users. Specifically, other objectives, in which other users with history information and a proficiency level similar to those of the user who is wearing the HMD 1 are proficient, are estimated as having an easy proficiency for the user who is wearing the HMD 1. For example, in the case where a user B, who has a similar age, gender, body shape and sports experience as a user A, is skillful at tennis, the estimation section 24 will estimate that there is a potential of tennis for the user A, even if the user A has not had any experience of tennis up to now.

The estimation section 24 outputs the estimated other objectives to the generation section 27.

(Detection Section 25)

The detection section 25 has a function which detects operation tendencies of a user, that is, habits, from the history information stored in the storage section 22. Specifically, the detection section 25 detects operation tendencies of a user, by discovering actions which are repeating under the same conditions from the history information. For example, the detection section 25 detects a habit of rushing a corner by over speed, for a user who repeatedly rushes a corner by over speed in a circuit.

The detection section 25 outputs the detected operation tendencies of the user to the generation section 27.

(Acquisition Section 26)

The acquisition section 26 has a function as an operation acquisition section which acquires, in real time, operations of the user. Specifically, the acquisition section 26 acquires operations of the user, by recognizing captured images of the direction visually recognized by the user and captured images capturing the user, which have been received from the HMD 1. Further, the acquisition section 26 acquires operations of the user, based on audio data, position information, acceleration information or the like, which has been received from the HMD 1. For example, in motor sports, the acquisition section 26 acquires information which shows that a straight course has been traveled, hereinafter called taking a curve, from the position information and captured images of the visual direction of the user.

Further, the acquisition section 26 has a function as a state acquisition section which acquires, in real time, a state of the user. Specifically, the acquisition section 26 acquires a state of the user, such as a decrease in strength or concentration, tension/slackness, fatigue or changes in muscle stiffness of the user, based on observation information observed by the observation section 124 of the HMD 1. Alternatively, the acquisition section 26 can acquire a state of the user, based on a recognition result of captured images capturing the user or audio data, which has been received from the HMD 1.

In addition, the acquisition section 26 has a function as an environmental information acquisition section which acquires environmental information of the surroundings of the user. Specifically, the acquisition section 26 acquires environmental information which shows the environment of the surroundings of the user, based on the temperature, weather, humidity, captured images or audio data of the surroundings, which has been received from the HMD 1.

The acquisition section 26 outputs information which shows the operations and state of the user acquired in real time, and environmental information of the surroundings, to the generation section 27.

(Generation Section 27)

The generation section 27 has a function which generates advice for achieving an objective, based on a proficiency level calculated by the calculation section 23. Specifically, the generation section 27 generates, in accordance with a proficiency level of the user, advice for achieving an objective, such as advancement, developing one's merits or overcoming weaknesses, for operations such as sports, cooking, manufacturing operations, musical performances, calligraphy or games. At this time, the generation section 27 generates advice which specifies good points of the user, and praises the achievement of an objective in accordance with the presented advice. In this way, the advice presentation system can realize improvements in the technique level of the user and maintenance or improvement in motivation.

As described above, the generation section 27 generates advice more abstractly when the proficiency level is high, and generates advice more specifically when the proficiency level is low. In this way, the advice presentation system can present advice in accordance with the technique level of the user. Further, the generation section 27 can preferentially generate advice related to operations in which the proficiency level calculated by the calculation section 23 is low. In this way, the advice presentation system can intensively impose training for correcting the weak points of the user, and as a result of this can allow the weak points to be overcome. Further, the generation section 27 can generate advice based on a proficiency level for each partial operation. In this way, the advice presentation system can present detailed advice which is at a different level for each partial operation, and advice which recommends partial training such as for the hands and feet or for the arms.

Further, in the case where the proficiency level has exceeded a threshold, the generation section 27 may not generate any advice by judging that advice may be unnecessary. Further, in the case where the user is unable to improve even if having a proficiency level which is not said to be that of a beginner, the generation section 27 may prompt the user to start again from the basics, by generating advice for a beginner.

Alternatively, the generation section 27 generates advice which recommends other objectives which have been estimated by the estimation section 24. In this way, the advice presentation system can inform the user of other objectives capable of being easily achieved, for example, other sports or the like for which there is a potential. Note that, the generation section 27 may generate advice which recommends other objectives in which partial operations with a high proficiency level may be necessary, which have been calculated by the calculation section 23.

Further, the generation section 27 generates advice in accordance with operation tendencies of the user, which have been detected by the detection section 25. There are cases where an experienced person who has had habits is prevented from further improvement due to the bad habits, even if having some degree of proficiency. In such a case, by generating advice based on the operation tendencies of the user, the advice presentation system is made aware of the bad habits which are unconsciously performed by the user, and can present advice for allowing the bad habits to be corrected.

Further, the generation section 27 generates advice based on real time operations and state of the user, which have been acquired by the acquisition section 26. Specifically, the generation section 27 gives advice of points to be noted for operations to be performed hereinafter by the user, and gives feedback of points to be corrected after the operations, based on user operations acquired by the acquisition section 26. In this way, the advice presentation system can present advice which is suitable for the present condition of the user with a better timing, during and after playing sports, during or after cooking, or during or after manufacturing.

Further, the generation section 27 generates advice based on environmental information of the surroundings of the user, which has been acquired by the acquisition section 26. Specifically, the generation section 27 generates advice suitable for the environment, such as weather, temperature, noise or time, which has been acquired by the acquisition section 26. For example, in motor sports, the generation section 27 generates advice which instructs that a long time be taken for warming the tires in the case of a low temperature.

The generation section 27 can generate advice for the user who is wearing the HMD 1 (a first user), based on advice generated for another user (a second user) who has attribute information similar to that of the user who is wearing the HMD 1. This is because since there are cases where advancement is prevented due to similar factors in the case of having similar physical features, it is considered that advice useful for another user who has similar physical features will be similarly useful. For example, in motor sports, the generation section 27 can present, to the user, advice which is effective for surmounting a wall preventing time reductions which has already been experienced by another similar user, and advice which is effective for correcting driving tendencies.

In addition, the generation section 27 may generate advice which instructs so as to perform operations which another user has performed in the past, based on history information of another user, who has similar physical features to the user and a higher proficiency level than the user. In this way, while not described in instruction books and manuals, such as a novice cleaning with a cloth, or beginners of world cooking washing pans, the generation section 27 can give advice to the user, so as to perform operations which have been effective for advancement of those who have performed them before.

Further, the generation section 27 can generate advice for an objective (a second objective) to be achieved by the user who is wearing the HMD 1, based on the proficiency level (a first proficiency level) of the operations for achieving another objective (a first objective). For example, the advice presentation system can present advice for preventing rushing into an intersection by over speed on normal roads other than a circuit, for the user who rushes into a corner by over speed in a circuit. Further, the advice presentation system can present other recommended recipes in accordance with a good cooking method of the user.

The generation section 27 may generate not only advice related to operations, but also advice related to tools used for the operations. Specifically, the generation section 27 generates advice for setting tools used for operations by the user. For example, the generation section 27 generates advice which suggests settings such as the adjustment of a car seat or a racket, or the heating of a stove, in accordance with the proficiency level and physical features of the user. Alternatively, the generation section 27 generates advice for selecting tools used for operations by the user. For example, the generation section 27 generates advice which recommends an appropriate golf club for the user who is playing golf, in accordance with obstacles, the wind or the state of the ground. In this way, the generation section 27 can contribute to advancement of the user in terms of tools, by suggesting a selection or usage method of the tools.

The generation section 27 may change the contents of the advice in accordance with the age of the user. For example, since it is considered that there is a tendency to obtain advice or praise more immediately effective when the age is older, the generation section 27 generates advice more immediately effective when the age is older, and advice which emphasizes the strong points of the user. In this way, the advice presentation system can present advice which is easily accepted by the user.

In this way, by generating appropriate advice in accordance with the features and state of the user, the generation section 27 can realize improvements in the advancement speed of the user and maintenance of motivation.

The generation section 27 outputs information which shows the generated advice to the communication section 21.

Heretofore, a configuration of the server 2 according to the present embodiment has been described. To continue, an operation process of the advice presentation system according to the present embodiment will be described by referring to FIG. 4 to FIG. 6.

[2-1-3. Operation Process]

Figure 4:
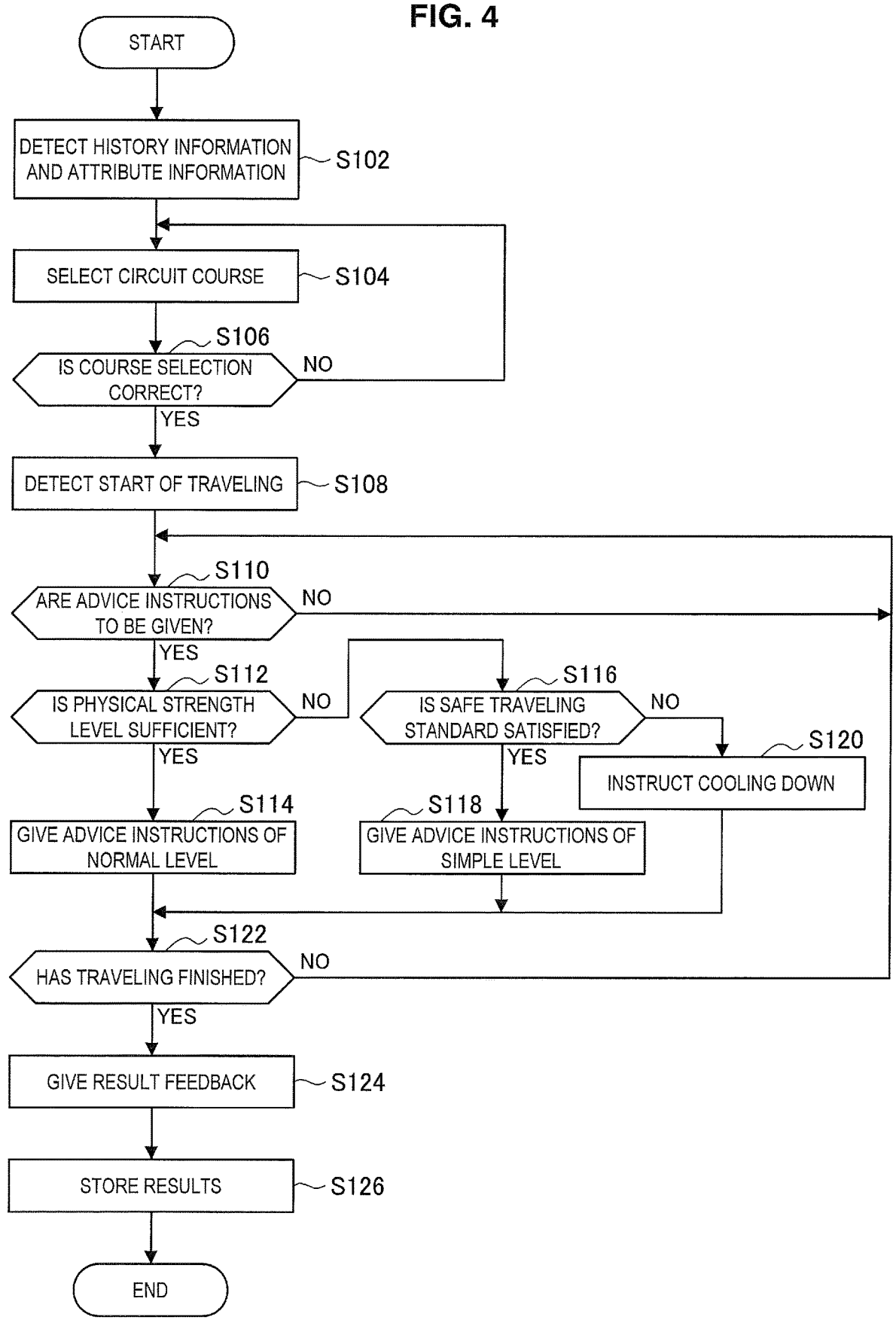
FIG. 4 is a flow chart which shows the operations of an advice presentation system according to a first embodiment of the present disclosure.

FIG. 4 is a flow chart which shows the operations of the advice presentation system according to the first embodiment. Here, an operation process will be described in an example in which the advice presentation system presents advice for a user who performs motor sports.

First, in step S102, the server 2 retrieves history information and attribute information of the user from the storage section 22. Specifically, the storage section 22 outputs, to the calculation section 23, the estimation section 24 and the detection section 25, history information and attribute information relating to motor sports for the user who is wearing the HMD 1. For example, result information such as the traveling time or position in various circuit courses, the speed or traveling line when rushing a curve, the braking timing or the steering timing can be considered as history information relating to motor sports. Further, the age, gender, weight, dominant arm, physical strength level, eyesight, muscular strength or the like of the user can be considered as attribute information relating to motor sports.

Next, in step S104, the server 2 selects the circuit course in which the user is traveling. In more detail, the acquisition section 26 acquires information which shows the circuit course in which the user is traveling. For example, the acquisition section 26 recognizes that a circuit course, in a location shown by the position information acquired by the position acquisition section 123 of the HMD 1, is the circuit course in which the user is traveling. Alternatively, the acquisition section 26 may acquire information which shows the circuit course in which the user is traveling, based on a voice input or gesture input of the user, or an input by an operation section of buttons or the like, which is not shown in the figures.

Next, in step S106, the server 2 judges whether or not the course selection is correct. For example, the acquisition section 26 judges whether or not the course selection is correct, based on whether or not the circuit course shown by the position information matches the circuit course input by the user. In the case where it is judged that the course selection is incorrect (S106/NO), the process returns again to step S104. On the other hand, in the case where it is judged that the course selection is correct (S106/YES), the process proceeds to step S108.

Next, in step S108, the server 2 detects that, the user has started to travel the circuit course. Specifically, the acquisition section 26 acquires that the user has started to travel, based on the acceleration of the user, captured images of the driving scenery, and the movement condition of the HMD 1 shown by the position information.

Next, in step S110, the server 2 judges whether or not to give advice instructions to the user. Specifically, the generation section 27 judges the advisability of advice instructions, based on information which shows the traveling condition of the user acquired by the acquisition section 26. For example, the generation section 27 performs a judgment so as not to give instructions in the case of a separation of 500 m or more from the curve, and to give instructions if within 500 m. In the case where it is judged not to give advice instructions (S110/NO), the process returns again to step S110. On the other hand, in the case where it is judged to give advice instructions, the process proceeds to step S112.

Next, in step S112, the server 2 judges whether or not the physical strength level of the user is sufficient. Specifically, the generation section 27 judges whether or not the physical strength level of the user is sufficient, based on history information and attribute information of the user, and information acquired by the acquisition section 26. For example, the generation section 27 judges the physical strength level of the user, in accordance with vital signs of the user, the weather, temperature, traveling time, and age and gender of the user, which have been observed by the observation section 124 of the HMD 1.

Here, the generation section 27 changes the advice to be generated such as described later, in accordance with the judged physical strength level. Since control of a car in a circuit normally uses a lot of physical strength, operations in which a faster response speed and more strength may be necessary will become a problem in a state in which the physical strength level has decreased. In the case where brain waves, a heartbeat or respiration can be directly measured by the observation section 124, a physical strength threshold of an advice level change is set based on data acquired by the observation section 124. On the other hand, in the case of not being able to directly measure by the observation section 124, a physical strength threshold of an advice level change is set based on the period of time in which the lap time shown by the history information of the user has started to decrease, and data of other people who have a similar physique shown by the attribute information.

In the case where it is judged that the physical strength level is sufficient (S112/YES), in step S114, the generation section 27 generates advice of a normal level, from among the advice corresponding to the proficiency level of the user. Here, advice of a normal level generated by the generation section 27 will be specifically described by referring to FIG. 5.

Figure 5:
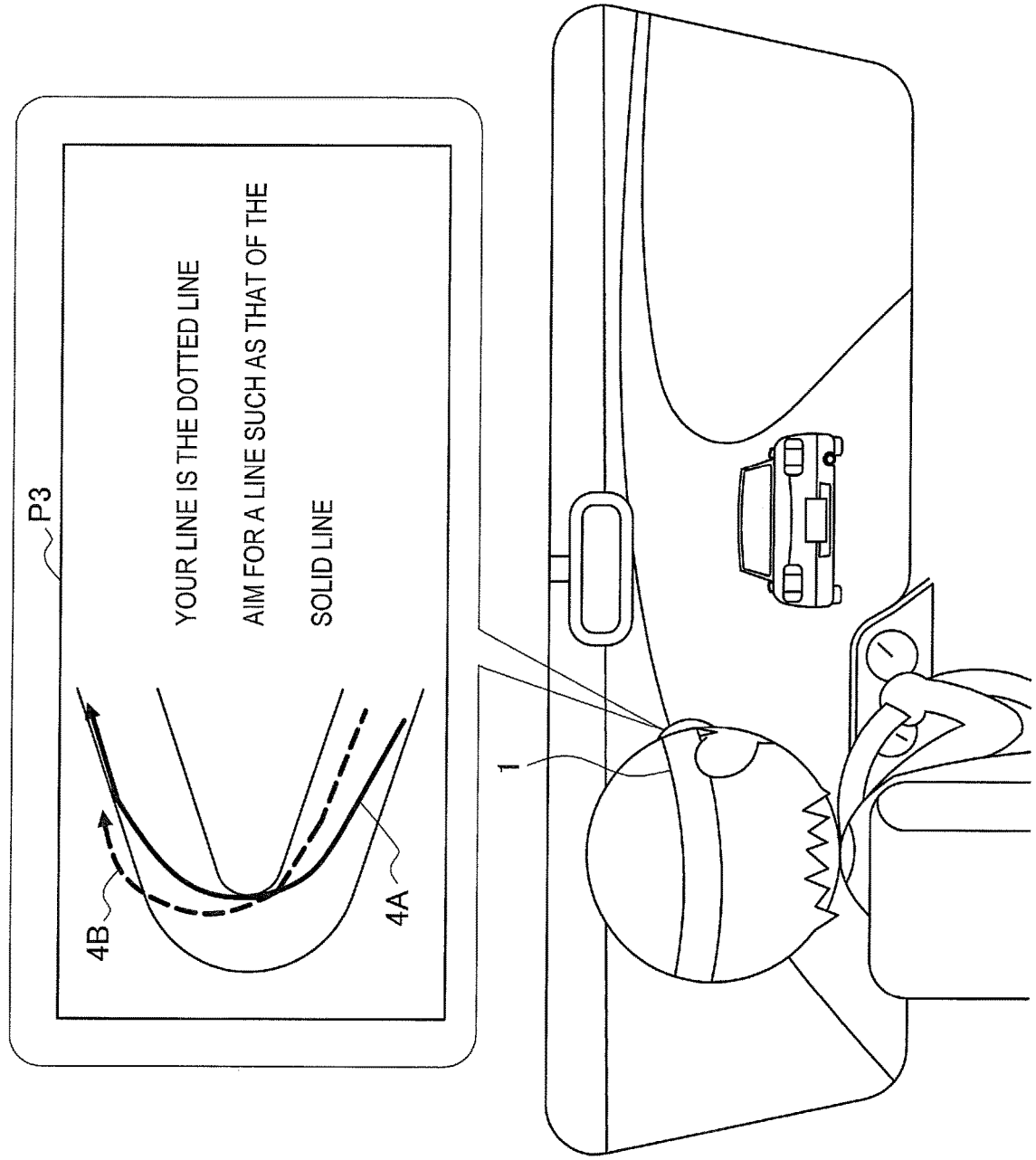
FIG. 5 is a figure which shows an example of advice presented by the HMD according to the first embodiment.

FIG. 5 is a figure which shows an example of advice presented by the HMD 1 according to the first embodiment. As shown in FIG. 5, the generation section 27 generates an image P3 which shows an ideal traveling line 4A in which out-in-out is shown, and the HMD 1 presents the user with the image P3 at a timing of approaching the curve. Here, since the physical strength level is sufficient, it is possible for the user to understand and execute the advice, even if it is advanced advice, in the case where the proficiency level of the user is high. Accordingly, as shown in FIG. 5, the generation section 27 generates advice of a normal level which presents the traveling line 4A, without performing specific instructions such as braking or steering control. In addition, as shown in FIG. 5, the generation section 27 provides the user with an opportunity to consider improvements from operations of the past, by allowing a traveling line 4B, which shows a path traveled by the user in the past, to be additionally superimposed.

On the other hand, in the case where it is judged that the physical strength level is not sufficient (S112/NO), in step S116, the server 2 judges whether or not the physical strength level of the user satisfies a safe traveling standard. As described above, control of a car in a circuit uses a lot of physical strength. Accordingly, in the case where the physical strength level is not sufficient but satisfies a safe traveling standard, the server 2 presents advice of a simple level, and in the ease where the physical strength level also does not satisfy a safe traveling standard, the server 2 presents advice additionally lowering the level.

In the case where it is judged that the physical strength level of the user satisfies a safe traveling standard (S116/YES), in step S118, the generation section 27 generates advice of a simple level, from among the advice corresponding to the proficiency level of the user. Here, advice of a simple level generated by the generation section 27 will be specifically described by referring to FIG. 6.

Figure 6:
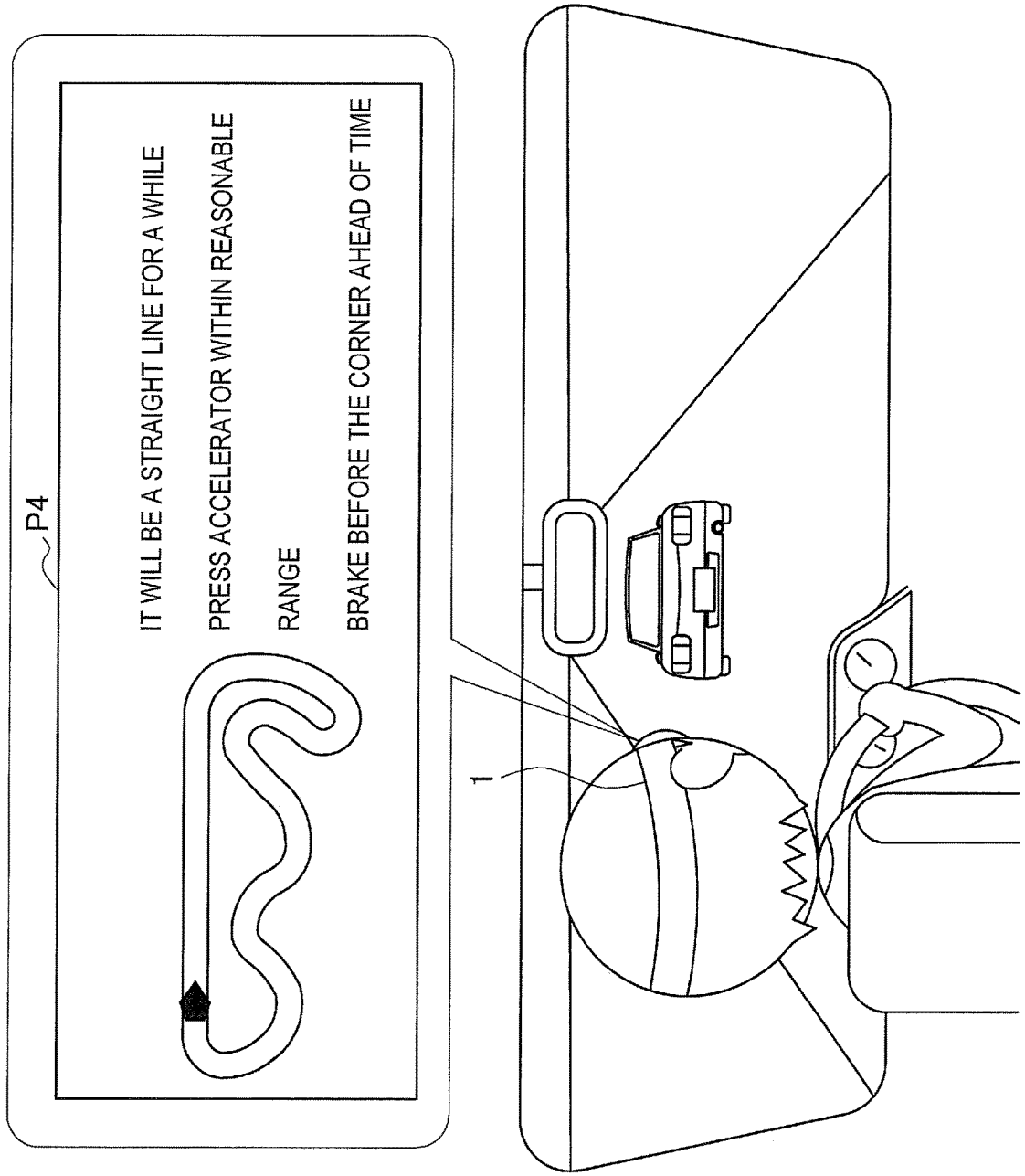
FIG. 6 is a diagram which shows an example of advice presented by the HMD according to the first embodiment.

FIG. 6 is a figure which shows an example of advice presented by the HMD 1 according to the first embodiment. As shown in FIG. 6, the generation section 27 generates an image P4, in which specific advice is given for a user who is traveling in a straight line, and the HMD 1 presents the user with the image P4. Here, since the physical strength level is not sufficient due to fatigue or the like, it will be difficult for the user to understand and execute advanced advice, even if having a high proficiency level. Accordingly, as shown in FIG. 6, the generation section 27 generates advice of a simple level, in which specific instructions are given for acceleration and braking control.

On the other hand, in the case where it is judged that the physical strength level of the user does not satisfy a safe traveling standard (S116/NO), in step S120, the generation section 27 generates advice which instructs cooling down. In the case where the physical strength level of the user does not satisfy a safe traveling standard, there is the possibility that an accident will occur due to a decrease in the ability to concentration and the ability to judge. The generation section 27 can prevent such accidents before they occur, by instructing cooling down.

Next, in step S122, the server 2 judges whether or not the user has finished traveling. Specifically, the generation section 27 judges whether or not the user has finished traveling, based on the acceleration of the user, captured images of the driving scenery and the movement condition of the HMD 1 shown by the position information, which have been acquired by the acquisition section 26. In the case where it is judged that the user has not finished traveling (S122/NO), the process returns again to step S110. On the other hand, in the case where it is judged that the user has finished traveling (S122/YES), the process proceeds to step S124.

Then, in step S124, the server 2 gives feedback of a traveling result for the user. For example, the generation section 27 generates advice which allows a result comparing the traveling time or traveling line of the past with that of this time, improvements/reductions in the proficiency level, and advantages/weaknesses to be notified, and the HMD 1 presents the generated advice to the user.

Next, in step S126, the server 2 accumulates traveling results of the user in the storage section 22 as history information. By accumulating history information of the user, the server 2 can more appropriately set the physical strength threshold of an advice level change in the above described step S112 and the safe traveling standard in the above described step S116. Further, by having the server 2 compare the execution result by the user with the presented advice, advice which has a low effect is not presented the next time, and advice which has a tendency to be more easily accepted is presented from the next time. In this way, by accumulating history information, the server 2 can present the user with safer and more effective advice.

Heretofore, an operation process of the advice presentation system according to the first embodiment has been described.

2-2. The Second Embodiment

The present embodiment is an embodiment in which the advice presentation system presents advice for a user who is playing golf. Note that, since the configuration of the advice presentation system according to the present embodiment is the same as that described for the above described first embodiment, a detailed description will be omitted here. Hereinafter, an outline of the advice presentation process according to the present embodiment will be described by referring to FIG. 7.

[2-2-1. Outline]

Figure 7:
FIG. 7 is an explanatory diagram which shows an outline of an advice presentation process according to a second embodiment of the present disclosure.

FIG. 7 is an explanatory diagram which shows an outline of the advice presentation process according to a second embodiment. As shown in FIG. 7, a user who is wearing the HMD 1 is playing golf on a sloping surface. Here, as shown in FIG. 7, in the case where the user is right-handed, the user stands on the side of the sloping surface higher than the ball, and hits the ball in a state of lowering the toes. Here, a state of lowering the toes is a state in which the toes are lower than the heels, and occurs when standing on an upper side of a sloping surface and hitting a ball on a lower side. Conversely, a state of raising the toes is a state in which the toes are higher than the heels, and occurs when standing on a lower side of a sloping surface and hitting a ball on an upper side.

Further, as shown in FIG. 7, wind blowing from behind the user, and woods present in front of the course, relate to the environment of the surroundings of the user. Further, there is a golf bag behind the user, and there are multiple golf clubs prepared.

The advice presentation system according to the present embodiment performs presentation of advice for a user who is in such a state. Here, for example, the method of attacking the course can be changed according to whether the ball trajectory of the user is a fade/slice system or a draw/hook system. Further, since the carry will change by gender differences, muscular strength, build of the muscles, amount of experience, head speeds or the like, an appropriate club selection can be changed in accordance with the conditions. Accordingly, suitable advice will differ in accordance with the condition of the course and physical features, even if the proficiency levels of users are the same.

Accordingly, for example, the advice presentation system gives advice, based on information such as gender, dominant arm, height or weight, which is attribute information of the user. Alternatively, the advice presentation system gives advice so as to select another golf club prepared in the golf bag, based on information which shows the carry, ball trajectory or head speed, which is history information, or information such as a fatigue level which shows a state of the user. Further, the advice presentation system may give advice related to the direction or angle at which the ball is hit, based on information which shows the wind orientation, the wind speed or obstacles such as woods in front, which are one part of environmental information.

Hereinafter, a specific operation process, in an example in which the advice presentation system gives advice based on information which shows the dominant arm of the user, will be described by referring to FIG. 8.

[2-2-2. Operation Process]

Figure 8:
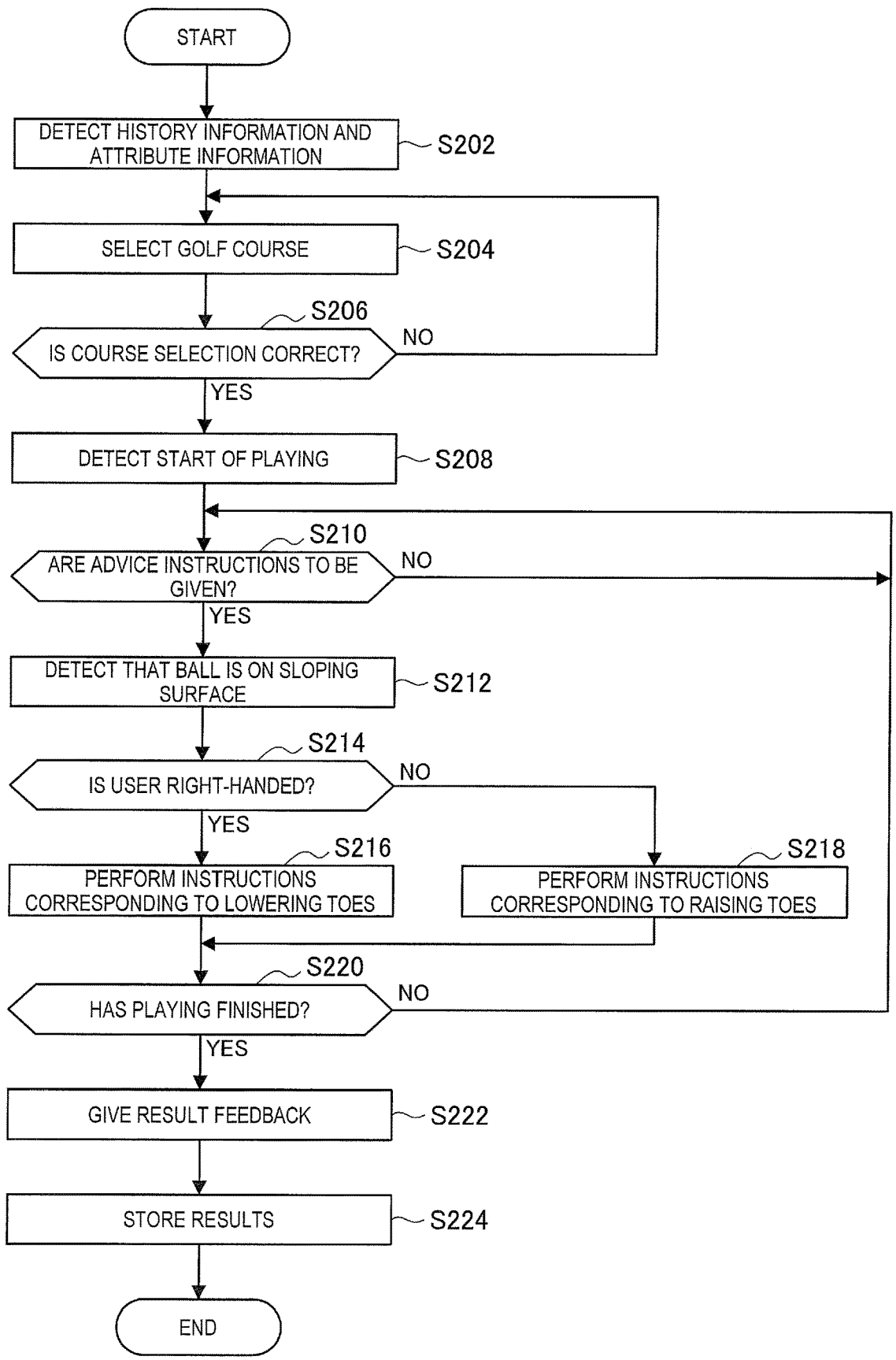
FIG. 8 is a flow chart which shows the operations of an advice presentation system according to the second embodiment.

FIG. 8 is a flow chart which shows the operations of the advice presentation system according to the second embodiment.

First, in step S202, the server 2 retrieves history information and attribute information of the user relating to golf from the storage section 22. For example, playing conditions such as the number of hits or the carry in various golf courses can be considered as history information relating to golf. Further, the age, gender, height, weight, dominant arm, physical strength level or muscular strength of the user can be considered as attribute information relating to golf.

Next, in step S204, the server 2 selects the golf course in which the user is playing. In more detail, the acquisition section 26 acquires information which shows the golf course in which the user is playing, based on position information acquired by the position acquisition section 123 of the HMD 1, and an input result by the user.

Next, in step S206, the server 2 judges whether or not the course selection is correct. For example, the acquisition section 26 judges whether or not the course selection is correct, based on whether or not the golf course shown by the position information matches the golf course input by the user. In the case where it is judged that the course selection is incorrect (S206/NO), the process returns again to step S204. On the other hand, in the case where it is judged that the course selection is correct (S206/YES), the process proceeds to step S208.

Next, in step S208, the server 2 detects that the user has started to play on the golf course. Specifically, the acquisition section 26 acquires that the user has started to play, based on perspiration and the walk of the user, vibrations occurring due to a swing, captured images of the playing scenery, and a movement condition of the HMD 1 shown by the position information.

Next, in step S210, the server 2 judges whether or not to give advice instructions for the user. Specifically, the generation section 27 judges the advisability of advice instructions, based on information which shows the playing condition of the user acquired by the acquisition section 26. For example, the generation section 27 performs a judgment so as to not give instructions while the user is hitting the ball, and to give instructions while the user is preparing to hit the ball. In the case where it is judged not to give advice instructions (S210/NO), the process returns again to step S210. On the other hand, in the case where it is judged to give advice instructions (S210/YES), the process proceeds to step S212.

Next, in step S212, the server 2 detects that the ball is on a sloping surface such as shown in FIG. 7. For example, the acquisition section 26 acquires that the ball is on a sloping surface, based on captured images of the playing scenery, the position information or the like.

Next, in step S214, the server 2 judges whether or not the user is right-handed. Specifically, the detection section 25 judges whether or not the user is right-handed, based on information which shows the dominant arm in the attribute information of the user.

In the case where it is judged that the user is right-handed (S214/YES), in step S216, the server 2 presents advice which shows a correspondence to lowering the toes. As shown in FIG. 7, the user hits the ball in a state of lowering the toes in the sloping surface shown in FIG. 7. Accordingly, the generation section 27 generates advice related to a method of hitting the ball in a state of lowering the toes, and the HMD 1 presents the generated advice to the user.

On the other hand, in the case where it is judged that the user is left-handed (S214/NO), in step S218, the server 2 presents advice which shows a correspondence to raising the toes. In the case where the user is left-handed, the user stands on a lower side of a sloping surface, hits the ball on an upper side, and hits the ball in a state of raising the toes in the sloping surface shown in FIG. 7. Accordingly, the generation section 27 generates advice related to a method of hitting the ball in a state of raising the toes, and the HMD 1 presents the generated advice to the user.

Next, in step S220, the server 2 judges whether or not the user has finished playing. Specifically, the generation section 27 judges whether or not the user has finished playing, based on captured images of the playing scenery, position information or the like, which have been acquired by the acquisition section 26. In the case where it is judged that the user has not finished playing (S220/NO), the process returns again to step S210. On the other hand, in the case where it is judged that the user has finished playing (S220/YES), the process proceeds to step S222.

Then, in step S222, the server 2 gives feedback of a playing result for the user. For example, the generation section 27 generates advice which allows a result comparing the score or the carry of the past with that of this time, improvements/reductions in the proficiency level, and advantages/weaknesses to be notified, and the HMD 1 presents the generated advice to the user. Note that, the server 2 may give feedback of a playing result at any time during play and is not limited to after playing is finished.

Next, in step S224, the server 2 accumulates playing results of the user in the storage section 22 as history information. Then, the calculation section 23 calculates a proficiency level related to golf of the user, based on the playing results accumulated in the storage section 22. Further, the detection section 25 detects habits of the user, such as the ball trajectory or the swing form of the user, based on the playing results accumulated in the storage section 22.

At this time, the proficiency level calculated by the calculation section 23 and the habits detected by the detection section 25 may be stored in the storage section 22. In this way, the calculation section 23 and the detection section 25 can store in the storage section 22 and output to the generation section 27 without performing calculation/detection every time advice of the user is presented. Note that, the calculation of the proficiency level by the calculation section 23, the detection of habits by the detection section 25 and the storage of these types of information are not limited to after playing is finished, and may be performed at any time during playing.

Alternatively, the estimation section 24 can estimate that there is a potential of other sports (other objectives) which have not been played by the user, by referring to other user data in which the history information and proficiency level related to golf is similar. For example, the estimation section 24 estimates that there is a potential of tennis which includes similar partial operations, based on the proficiency level of partial operations such as the rotation of the hips and the movement of the feet when performing swinging in golf. Then, the generation section 27 may generate advice which recommends that tennis be played, and present the generated advice to the user.

Heretofore, an operation process of the advice presentation system according to the second embodiment has been described.

2-3. The Third Embodiment

The present embodiment is an embodiment in which the advice presentation system presents advice for a user who is cooking. Note that, since the configuration of the advice presentation system according to the present embodiment is the same as that described for the above described first embodiment, a detailed description will be omitted here. Hereinafter, an outline of the advice presentation process according to the present embodiment will be described by referring to FIG. 9.

[2-3-1. Outline]

Figure 9:
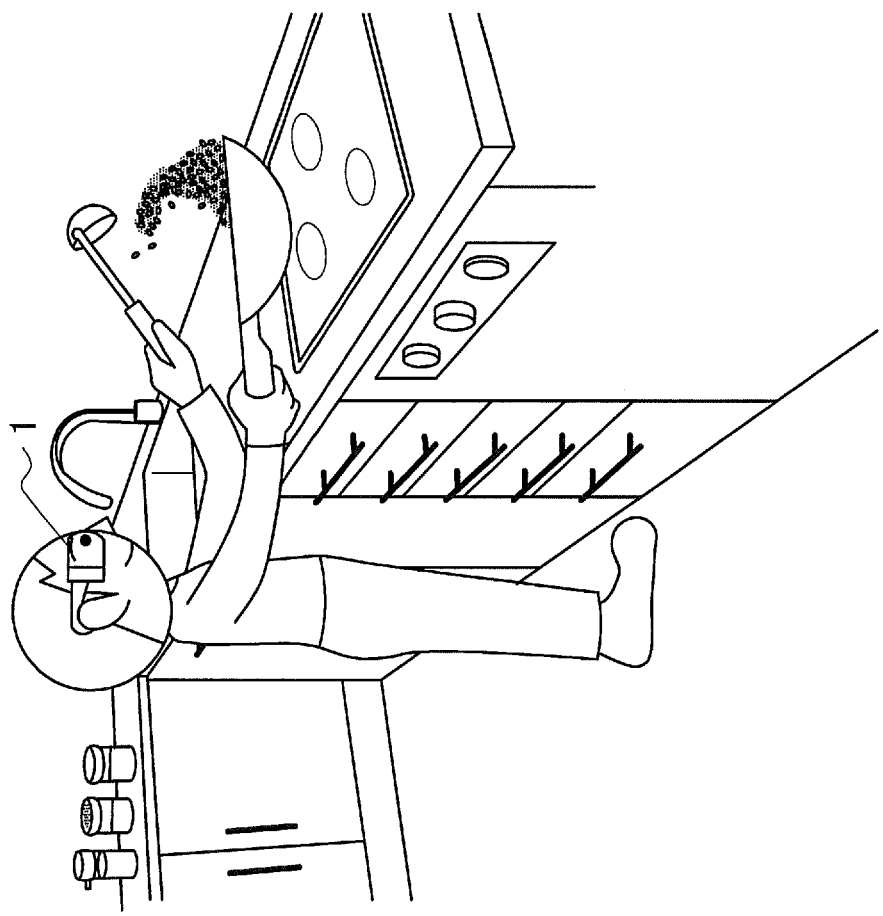
FIG. 9 is an explanatory diagram which shows an outline of an advice presentation process according to a third embodiment of the present disclosure.

FIG. 9 is an explanatory diagram which shows an outline of the advice presentation process according to a third embodiment.

As shown in FIG. 9, a user who is wearing the HMD 1 is frying fried rice in a kitchen. Generally, a cooking method which fries quickly with a high heat is assumed to be good for fried rice, and when the pan is flipped while frying with a strong heat, a light texture and good taste will be made. However, since the pan used by the user is heavy, it will be difficult to fry the fried rice while flipping the pan for a person with low muscular strength, a female, or a person whose physical strength level has fallen due to fatigue. Accordingly, the advice presentation system according to the present embodiment presents advice which instructs whether to fry while flipping the pan, or whether to mix quickly mix with the pan placed as it is, based on attribute information such as the gender, physique or muscular strength of the user, or a state such as the fatigue level of the user.

Further, as shown in FIG. 9, a stove has 3 openings, and seasoning is prepared on a kitchen counter. Accordingly, the advice presentation system according to the present embodiment may give advice which instructs so as to adjust the heat or use the stove with the maximum heat strength, or advice which adds seasoning with a good timing, based on information which shows the stove and the seasoning on the counter, which are one part of environmental information. Alternatively, for example, the advice presentation system may give advice which instructs so as to break an egg in one hand, in accordance with the proficiency level of the user, and may present advice with a timing corresponding to the cooking speed.

Hereinafter, a specific operation process, in an example in which the advice presentation system gives advice based on whether or not the user is capable of flipping the pan, will be described by referring to FIG. 10.

[2-3-2. Operation Process]

Figure 10:
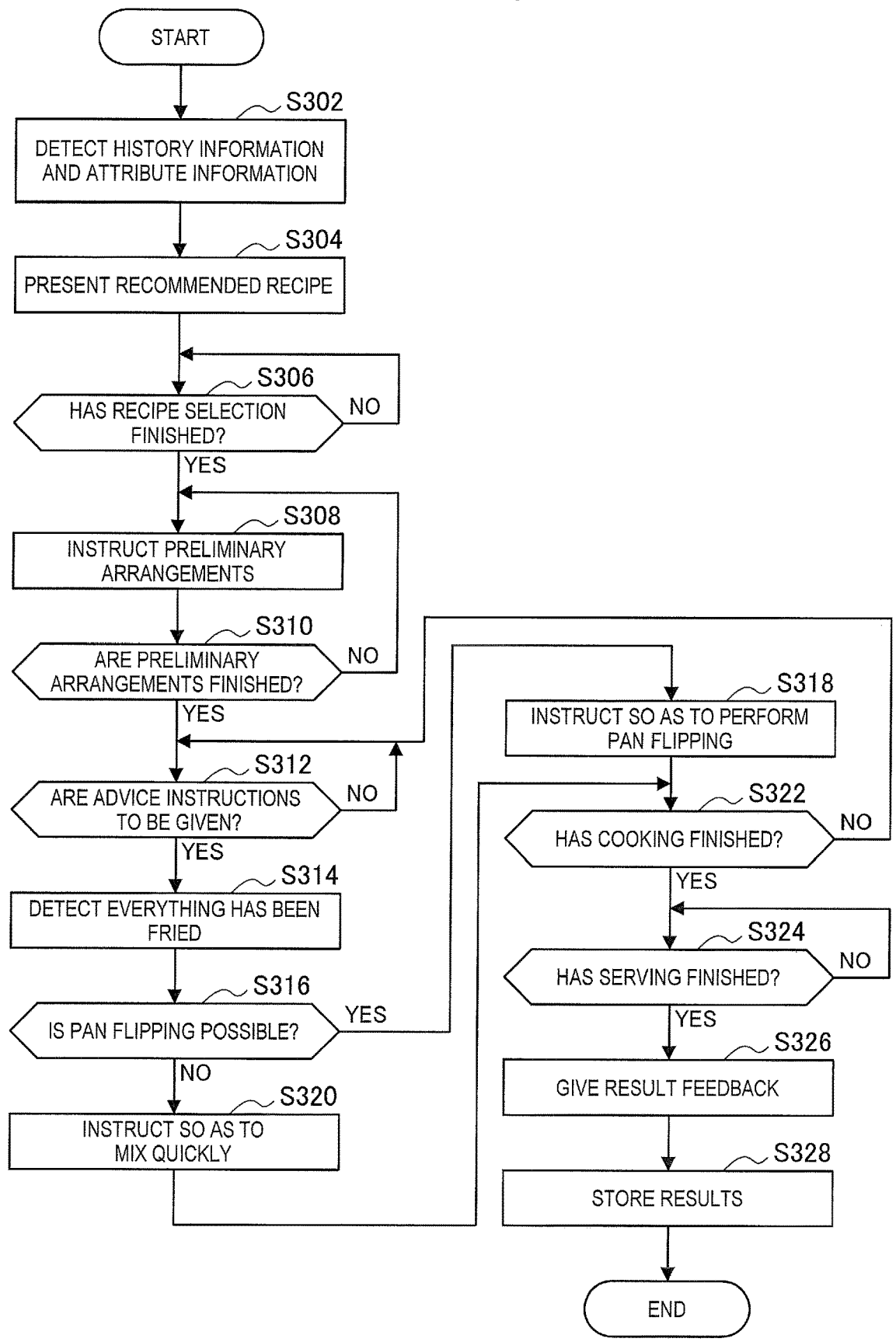
FIG. 10 is a flow chart which shows the operations of an advice presentation system according to the third embodiment.

FIG. 10 is a flow chart which shows the operations of the advice presentation system according to the third embodiment.

First, in step S302, the server 2 retrieves history information and attribute information of the user relating to cooking from the storage section 22. For example, the type of dishes and specialties of cooking which have been able to be cooked in the past, reproduced combinations of recipes or the like can be considered as history information relating to cooking. Further, the age, gender, weight, height, dominant arm and muscular strength of the user, preferred ingredients, and preferences such as whether or not the user is dieting, can be considered as attribute information relating to cooking.

Next, in step S304, the advice presentation system presents a recommended recipe to the user. For example, the advice presentation system presents a recipe which shows a usage amount of salt or fat content and a selection of suitable ingredients, in accordance with the attribute information of the user, a cooking history of the past, preferences or the like. At this time, the advice presentation system may present a recipe which incorporates fiber, a recipe which allows the calcium amount to be increased by incorporating dried young sardines or the like, or a recipe which cuts back on salt, based on information which shows the nutritional condition of the user or whether or not the user is dieting.

Next, in step S306, the server 2 judges whether or not the recipe has been selected. Specifically, the acquisition section 26 judges, based on a user input or the like, whether or not the recommended recipe presented in the above described step S304 has been accepted by the user. Note that, the user may input a recipe preferred by the user himself or herself to the HMD 1, by refusing the presented recipe. In the case where it is judged that the recipe has not been selected (S306/NO), the process returns again to step S306. On the other hand, in the case where it is judged that the recipe has been selected (S306/YES), the process proceeds to step S308.

Next, in step S308, the server 2 presents advice which instructs preliminary arrangements. For example, the generation section 27 generates advice which instructs so as to perform a preliminary arrangement of ingredients, such as beating eggs, chopping ingredients and frying individual ingredients beforehand, and the HMD 1 presents the generated advice to the user.

Next, in step S310, the server 2 judges whether or not the preliminary arrangements of the user are finished. Specifically, the generation section 27 judges whether or not the preliminary arrangements are finished, based on an input of the user showing that the preliminary arrangements are finished, a recognition result of captured images of the cooking scenery or the like. In the case where it is judged that the preliminary arrangements are not finished (S310/NO), the process returns again to step S310. On the other hand, in the case where it is judged that the preliminary arrangements are finished (S310/YES), the process proceeds to step S312.

Next, in step S312, the server 2 judges whether or not to give advice instructions to the user. Specifically, the generation section 27 judges the advisability of advice instructions, based on information which shows the cooking condition of the user acquired by the acquisition section 26. In the case where it is judged not to give advice instructions (S312/NO), the process returns again to step S312. On the other hand, in the case where it is judged to give advice instructions (S312/YES), the process proceeds to step S314.

Next, in step S314, the server 2 detects that the user has fried all of the fried rice. For example, the acquisition section 26 detects that the user has fried all of the fried rice, based on captured images of the cooking scenery, frying sounds, or information which shows perspiration or vibrations of the arms of the user.

Next, in step S316, the server 2 judges whether or not the user is capable of flipping the pan. Specifically, the generation section 27 judges whether or not the user is capable of flipping the pan, based on the gender or muscular strength shown by the attribute information of the user, and a fatigue level of the arms shown by the state of the user.

In the case where it is judged that pan flipping is possible (S316/YES), in step S318, the server 2 presents advice which instructs so as to fry the fried rice while flipping the pan.

On the other hand, in the case where it is judged that pan flipping is not possible (S316/NO), in step S320, the server 2 presents advice which instructs so as to quickly mix with the pan placed as it is.

Next, in step S322, the server 2 judges whether or not the user has finished cooking. Specifically, the generation section 27 judges whether or not the user has finished cooking, based on captured images of the cooking scenery, the stopping of frying sounds or the like, which have been acquired by the acquisition section 26. In the case where it is judged that the user has not finished cooking (S322/NO), the process again returns to step S312. On the other hand, in the case where it is judged that the user has finished cooking (S322/YES), the process proceeds to step S324.

Next, in step S324, the server 2 judges whether or not the user has finished serving. Specifically, the generation section 27 judges whether or not the user has finished serving, based on captured images of the scenery in which the user serves the fried rice or the like, which have been acquired by the acquisition section 26. In the case where it is judged that the user has not finished serving (S324/NO), the process returns again to step S324. On the other hand, in the case where it is judged that the user has finished serving (S324/YES), the process proceeds to step S326.

Then, in step S326, the server 2 gives feedback of cooking and serving results for the user. For example, the generation section 27 generates advice which allows whether it can be cooked in accordance with a presented recipe, the flavor, beauty of serving, preliminary arrangements, improvements/reductions of the proficiency level of flipping the pan, and advantages/weaknesses to be notified, and the HMD 1 presents the generated advice to the user. Note that, the server 2 may give feedback of a cooking result at any time during cooking and is not limited to after cooking is finished.

Next, in step S328, the server 2 accumulates cooking results of the user in the storage section 22 as history information. Then, the calculation section 23 calculates a proficiency level related to cooking of the user, such as the use or skillfulness of a kitchen knife, the cooking speed or the physical strength to wield the pan, based on the cooking results accumulated in the storage section 22. Further, the detection section 25 detects habits of the user, such as the method of stirring of ingredients or the chopping method of ingredients, based on the cooking results accumulated in the storage section 22.

At this time, the proficiency level calculated by the calculation section 23 and the habits detected by the detection section 25 may be stored in the storage section 22. In this way, the calculation section 23 and the detection section 25 can store in the storage section 22 and output to the generation section 27 without performing calculation/detection every time advice of the user is presented. Note that, the calculation of the proficiency level by the calculation section 23, the detection of habits by the detection section 25 and the storage of these types of information are not limited to after cooking is finished, and may be performed at any time during cooking.

Alternatively, the estimation section 24 can estimate that there are other recipes (other objectives) capable of being applied by the cooking skill of the user, by referring to other user data in which the history information and proficiency level related to cooking are similar. Also, the generation section 27 may generate advice which recommends another recipe estimated by the estimation section 24, and may present the generated advice to the user.

Heretofore, an operation process of the advice presentation system according to the third embodiment has been described.

3. Conclusion

As described above, it is possible for the advice presentation system according to each of the above described embodiments to present suitable advice in accordance with features of the user. In particular, the advice presentation system can present effective advice for an improvement in technique and an improvement in motivation of the user, based on physical features such as the physique, muscular strength or moveable range of joints.

Further, in the case where advancement is prevented due to factors similar to those of another user who has similar physical features, the advice presentation system can present useful advice to the user, by referring to advice which has had a high effect for the other user. Alternatively, the advice presentation system can recommend sports which have a potential for the user, or recipes of cooking estimated to be able to be well made, by estimating operations which have a potential for the user.

It should be understood by those skilled in the art that various modifications, combinations, sub-combinations and alterations may occur depending on design requirements and other factors insofar as they are within the scope of the appended claims or the equivalents thereof.

For example, while an HMD 1 is used as an apparatus which presents advice to the user in the above described embodiments, the technology according to the present disclosure is not limited to this. For example, the apparatus which presents advice to the user may be a headset, a digital video camera, a PDA (Personal Digital Assistant), a PC (Personal Computer), a note PC a tablet terminal, a smartphone, a mobile phone terminal, a portable music playback device, a portable video processing device, or a portable game machine.

Further, while the advice presentation system is separated into the HMD 1 and the server 2 in the above described embodiments, the technology according to the present disclosure is not limited to this. For example, the functions of the server 2 may be included in the HMD 1. In addition, the information processing apparatus according to an embodiment of the present disclosure can be implemented by various types of equipment, such as a headset, smartphone or a portable terminal, in which the functions of the server 2 are included.

Further, while advice is presented to the user by an image display by the display section 13 in the above described embodiments, the technology according to the present disclosure is not limited to this. For example, the advice presentation system may present advice by audio guidance, vibration, flashing of lights or the like.

Further, a computer program for causing hardware, such as a CPU, ROM and RAM built into an information processing apparatus to exhibit functions similar to each of the configurations of the above described HMD 1 or server 2 can be created. Further, a storage medium having this computer program stored therein can also be provided.

Additionally, the present technology may also be configured as below.

(1) An information processing apparatus, including:
a calculation section which calculates a proficiency level of a user for operations performed by the user for achieving a prescribed objective based on history information related to the operations and attribute information related to physical features of the user; and
a generation section which generates advice for achieving the objective based on the proficiency level calculated by the calculation section.

(2) The information processing apparatus according to (1),
wherein the generation section generates advice for a first user based on the advice generated for a second user who has the attribute information similar to the attribute information of the first user.

(3) The information processing apparatus according to (1) or (2), further including:
an estimation section which estimates other objectives capable of being easily achieved by the user based on the history information and the proficiency level,
wherein the generation section generates the advice which recommends the other objectives estimated by the estimation section.

(4) The information processing apparatus according to any one of (1) to (3),
wherein the calculation section calculates the proficiency level for a plurality of partial operations by breaking down one of the operations, and
wherein the generation section generates the advice based on the proficiency level for each of the partial operations.

(5) The information processing apparatus according to any one of (1) to (4),
wherein the generation section generates the advice more abstractly when the proficiency level is high, and generates the advice more specifically when the proficiency level is low.

(6) The information processing apparatus according to any one of (1) to (5),
wherein the generation section preferentially generates the advice related to the operations in which the proficiency level is low.

(7) The information processing apparatus according to any one of (1) to (6), further including:
a detection section which detects operation tendencies of the user in the operations from the history information,
wherein the generation section generates the advice additionally based on the operation tendencies detected by the detection section.

(8) The information processing apparatus according to any one of (1) to (7),
wherein the calculation section calculates a first proficiency level for the operations performed for achieving a first objective, and
wherein the generation section generates the advice for achieving a second objective based on the first proficiency level.

(9) The information processing apparatus according to any one of (1) to (8),
wherein the generation section generates the advice related to tools used by the user for the operations.

(10) The information processing apparatus according to any one of (1) to (9), further including:
an operation acquisition section which acquires in real time operations performed by the user for achieving the objective,
wherein the generation section generates the advice additionally based on the operations acquired by the operation acquisition section.

(11) The information processing apparatus according to any one of (1) to (10), further including:
a state acquisition section which acquires a state of the user,
wherein the generation section generates the advice additionally based on the state acquired by the state acquisition section.

(12) The information processing apparatus according to any one of (1) to (11), further including:
an environmental information acquisition section which acquires environmental information of surroundings of the user,
wherein the generation section generates the advice additionally based on the environmental information acquired by the environmental information acquisition section.

(13) The information processing apparatus according to any one of (1) to (12),
wherein the attribute information is at least one of an age, gender, body shape, muscular strength, eyesight, hearing, dominant arm, dominant foot, dominant eye, and dominant ear of the user.

(14) The information processing apparatus according to any one of (1) to (13),
wherein the history information includes a history of the operations performed by the user and an achievement level of the objective.

(15) The information processing apparatus according to any one of (1) to (14), further including:
a presentation control section which presents the user with the advice generated by the generation section.

(16) A non-transitory computer-readable storage medium having a program stored therein, the program causing a computer to perform:
calculating a proficiency level of a user for operations performed by the user for achieving a prescribed objective based on history information related to the operations and attribute information related to physical features of the user; and
generating advice for achieving the objective based on the calculated proficiency level.

What is claimed is:
1. A non-transitory computer-readable medium having embodied thereon a program, which when executed by a computer causes the computer to execute a method, the method comprising:
calculating a proficiency level of a user for operations in a musical performance performed by the user for achieving an objective related to the operations in the musical performance based on history information related to the operations in the musical performance performed by the user and attribute information related to physical features of the user;

generating advice for achieving the objective related to the operations in the musical performance based on the proficiency level; and controlling presenting the advice for achieving the objective related to the operations in the musical performance to the user by output related to at least one of text, image, or audio, wherein the advice comprises one or more specific instructions for achieving the objective related to the operations in the musical performance, and wherein the proficiency level is based on at least one of strength or rhythm in the musical performance.

2. The non-transitory computer-readable medium according to claim 1, wherein the objective related to the operations in the musical performance includes at least one of advancement, developing one's merits, or overcoming weaknesses.

3. The non-transitory computer-readable medium according to claim 1, wherein the generation of the advice is based on at least one of muscular strength, moveable range of joints of the user, a decrease in strength due to fatigue, or a decrease in concentration due to fatigue.

4. The non-transitory computer-readable medium according to claim 1, wherein the executed method further comprises:

acquiring the operation from information obtained by a sensor section.

5. The non-transitory computer-readable medium according to claim 4, wherein the information obtained by the sensor section includes at least one of acceleration information, gyro information, vital information, image information, position information, or audio data.

6. The non-transitory computer-readable medium according to claim 5, wherein the acceleration information and gyro information shows a direction or an angle which the user is facing.

7. The non-transitory computer-readable medium according to claim 5, wherein the information obtained by the sensor section includes at least one of body temperature, pulse, blood pressure or respiration, perspiration, blinking, myoelectricity, or brain waves of the user.

8. The non-transitory computer-readable medium according to claim 1, wherein the attribute information includes at least one of age, gender, height, weight, muscular strength, dominant arm, or dominant foot of the user.

9. The non-transitory computer-readable medium according to claim 1, wherein the attribute information includes at least one of eyesight, hearing, dominant eye, or dominant ear of the user.

10. The non-transitory computer-readable medium according to claim 1, wherein the advice includes at least one of a good point or a bad point of the user.

11. The non-transitory computer-readable medium according to claim 1, wherein the advice instructs a cooling down.

12. The non-transitory computer-readable medium according to claim 1, wherein the advice is generated more abstractly when the proficiency level is high, and the advice is generated more specifically when the proficiency level is low.

13. The non-transitory computer-readable medium according to claim 1, wherein the advice is generated based on history information of another user who has similar physical features to the user and a higher proficiency level than the user.

14. The non-transitory computer-readable medium according to claim 13, wherein the generated advice instructs so as to perform operations in a musical performance which another user has performed in the past.

15. The non-transitory computer-readable medium according to claim 1, wherein the advice is controlled to be not presented to the user, based on the proficiency level of the user.

16. The non-transitory computer-readable medium according to claim 1, wherein the generated advice includes at least a positive achievement or a negative tendency.

17. The non-transitory computer-readable medium according to claim 1, wherein the executed method further comprises:

calculating the proficiency level for a plurality of partial operations by breaking down one of the operations; and generating the advice based on the proficiency level for each of the partial operations.

18. The non-transitory computer-readable medium according to claim 1, wherein the executed method further comprises:

preferentially generating the advice related to the operations in which the proficiency level is low.

19. An information processing method comprising:

calculating a proficiency level of a user for operations in a musical performance performed by the user for achieving an objective related to the operations in the musical performance based on history information related to the operations in the musical performance performed by the user and attribute information related to physical features of the user;

generating advice for achieving the objective related to the operations in the musical performance based on the proficiency level; and controlling presenting the advice for achieving the objective related to the operations in the musical performance to the user by output related to at least one of text, image, or audio, wherein the advice comprises one or more specific instructions for achieving the objective related to the operations in the musical performance, and wherein the proficiency level is based on at least one of strength or rhythm in the musical performance.

20. An information processing apparatus, comprising:

circuitry configured to:

calculate a proficiency level of a user for operations in a musical performance performed by the user for achieving an objective related to the operations in the musical performance based on history information related to the operations in the musical performance performed by the user and attribute information related to physical features of the user;

generate advice for achieving the objective related to the operations in the musical performance based on the proficiency level; and control presenting the advice for achieving the objective related to the operations in the musical performance to the user by output related to at least one of text, image, or audio,
wherein the advice comprises one or more specific instructions for achieving the objective related to the operations in the musical performance, and
wherein the proficiency level is based on at least one of strength or rhythm in the musical performance.

* * * * *